United States Patent [19]

Kawai

[11] Patent Number: 4,589,753
[45] Date of Patent: May 20, 1986

[54] LENS MOUNTING HAVING A REVERSIBLE MOTOR FOR CONTROLLING FOCUSING AND APERTURE SETTING OF A CAMERA

[75] Inventor: Tohru Kawai, Kanagawa, Japan

[73] Assignee: Canon Kabushiki Kaisha, Tokyo, Japan

[21] Appl. No.: 670,741

[22] Filed: Nov. 13, 1984

[30] Foreign Application Priority Data

Nov. 14, 1983 [JP] Japan .................. 58-175552[U]

[51] Int. Cl.⁴ .............................. G03B 3/10
[52] U.S. Cl. .................. 354/400; 354/195.1; 354/195.12; 354/286
[58] Field of Search ........... 354/400, 402, 286, 195.1, 354/195.11

[56] References Cited

U.S. PATENT DOCUMENTS

| | | | |
|---|---|---|---|
| 3,311,747 | 3/1967 | Smith, Jr. et al. | 250/83.3 |
| 4,152,060 | 5/1979 | Specht | 354/195 |
| 4,191,460 | 3/1980 | Fujiki | 354/25 |
| 4,274,735 | 6/1981 | Tamura et al. | 356/1 |
| 4,396,267 | 8/1983 | Hirohata et al. | 354/400 |
| 4,422,740 | 12/1983 | Kawai et al. | 354/402 |
| 4,504,137 | 3/1985 | Martin et al. | 354/195.1 |
| 4,519,691 | 5/1985 | Yamada et al. | 354/195.1 |

Primary Examiner—Russell E. Adams
Attorney, Agent, or Firm—Toren, McGeady, Stanger, Goldberg & Kiel

[57] ABSTRACT

A lens mounting having a control sleeve rotatable for axially moving a focusing lens member and a ring for driving diaphragm blades with a reversible motor incorporated therein, whereby focusing is operated when the motor rotates in one of the clockwise and counterclockwise directions, and the diaphragm is closed down when in the other direction.

5 Claims, 4 Drawing Figures

LENS MOUNTING HAVING A REVERSIBLE MOTOR FOR CONTROLLING FOCUSING AND APERTURE SETTING OF A CAMERA

BACKGROUND OF THE INVENTION

1. Field of the Invention

This invention relates to lens mountings, and more particularly to the control of focusing and aperture setting by a common built-in reversible motor.

2. Description of the Prior Art (1) The use of the conventional electric motor for operating the focusing mechanism with its layout inside the common casing of the lens mounting has been shown in many patents. Most of them and the methods employed in commercially available cameras are directed to provide auto-focus apparatus in which the period of energization of the motor is automatically controlled in accordance with the signal from the in-focus detector, while motion of the motor is transmitted through a gear train and rack-pinion connection or the like by axial movement of the focusing lens holder until the focusing lens reaches to the in-focus position. U.S. Pat. Nos. 4,274,735 and 4,422,740 are prior art documents which belong to the above-described category (1).

(2) A document which is concerned with known motor-built-in lens mounting is the specification of U.S. Pat. No. 4,152,060 (Japanese Patent Publication No. Sho 56-51328). The motorized focusing apparatus of this patent comprises a lens holder having a central axis substantially coincident with an optical axis of a lens contained therein, a stator concentric to the aforesaid optical axis, an epicyclic motor having a cylindrical armature in eccentric relation to the aforesaid optical axis upon actuation to epicyclically rotate, a transmission carrying the aforesaid lens holder rotatably in the interior of the aforesaid cylindrical armature and in concentric relation to the aforesaid optical axis upon rotation to move the aforesaid lens holder axially, and a drive connection between the armature and the transmission. Thus, this U.S. Patent uses a novel motor in which the rotor is provided with a central opening of sufficiently large diameter to admit of the light beam of the focusing lens.

The lens mounting is provided with a motor in which the rotor and stator are formed to the hollow core shape, and the inner diameter of the rotor is sufficient to admit the image bearing beam (electromagnetic drive device). There are known so-called accidental motion compensation type lens mountings, examples of which are shown in U.S. Pat. Nos. 3,311,747 and 3,552,834.

In the present state of the art of camera systems camera bodies and interchangeable lenses, there is a trend of increasing the proportion of electronic parts. In terms of lens mountings, too, the operating systems for focusing, zooming and aperture setting are being changed from requiring the help of the operator's hand to full automation using an electric motor. To impart automatic focusing and automatic diaphragm setting capabilities into the lens mounting in such a trend, if separate motors are employed, a problem arises in the design of lens mounting mechanisms.

That is, when the focusing lens and the diaphragm are driven by respective individual motors, the bulk, size, and weight of the lens mounting unit are objectionably increased, since good portability, minimum size, and light weight are essential to the candid camera.

A first object of the present invention is to provide a mechanical mounting for an objective with only one motor to carry out two different operations (focusing and diaphragm setting), since the direction of rotation of the motor is reversed.

Another object of the present invention is to provide a drive system for the mounting mechanism in which only one motor, upon rotation in one direction, effects automatic focusing and, upon rotation in the reversed direction, effects, automatic setting of the diaphragm aperture.

Still another object of the present invention is to provide the rotor of the aforesaid motor with a central aperture opening of a sufficiently large diameter to admit the image forming light beam from the focusing lens and to provide a mounting mechanism with means for transmitting the rotating torque of the aforesaid rotor to axial movement of the focusing lens and menas, while maintaining the focusing lens in focus, for moving the diaphragm device to the setting by the aforesaid motor, and particularly to obtain a lens mounting unit having no awkward projection due to the incorporated motor protruding from the outer barrel, or having a uniform outer appearance.

SUMMARY OF THE INVENTION

A lens mounting cooperative with a focusing control circuit including a lens holder containing a focusing lens; a control sleeve rotatable about an optical axis for controlling the axial movement of the lens holder; a diaphragm device including diaphragm blades, a drive ring for driving the diaphragm blades, and means for urging the diaphragm blades in a direction to a prescribed aperture valve; a motor arranged upon rotation about the optical axis in one direction to perform focusing, and upon rotation in the reverse direction to control the diaphragm device; first transmitting means for transmitting rotating power of the motor to the control sleeve; first arresting means responsive to a signal from the focusing control circuit for arresting and holding the focusing lens in the in-focus position; second transmitting means for transmitting rotating power of the motor to the drive ring; and second arresting means for arresting and holding the diaphragm blades in a sized aperture opening against the bias means.

DETAILED DESCRIPTION OF THE PREFERRED EMBODIMENT

Figure 1:
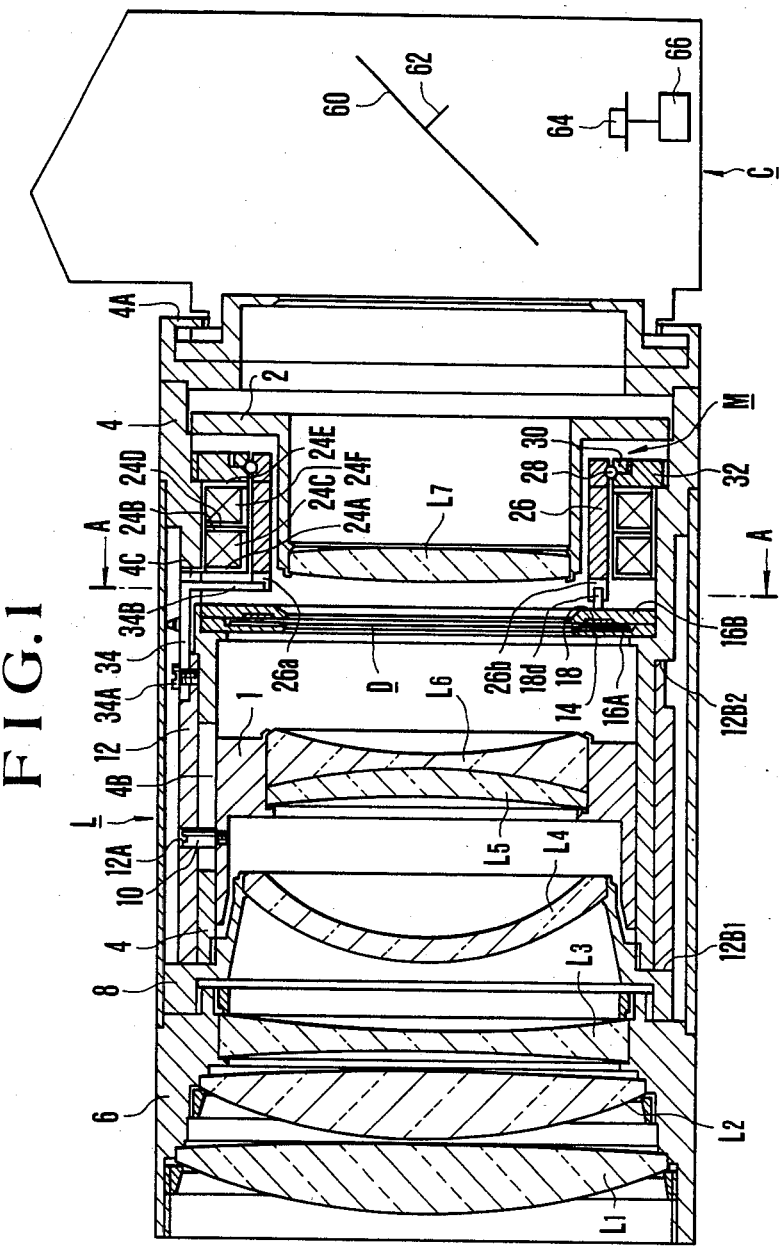
FIG. 1 is a longitudinal section of a lens mounting in an embodiment according to the present invention.
Figure 2:
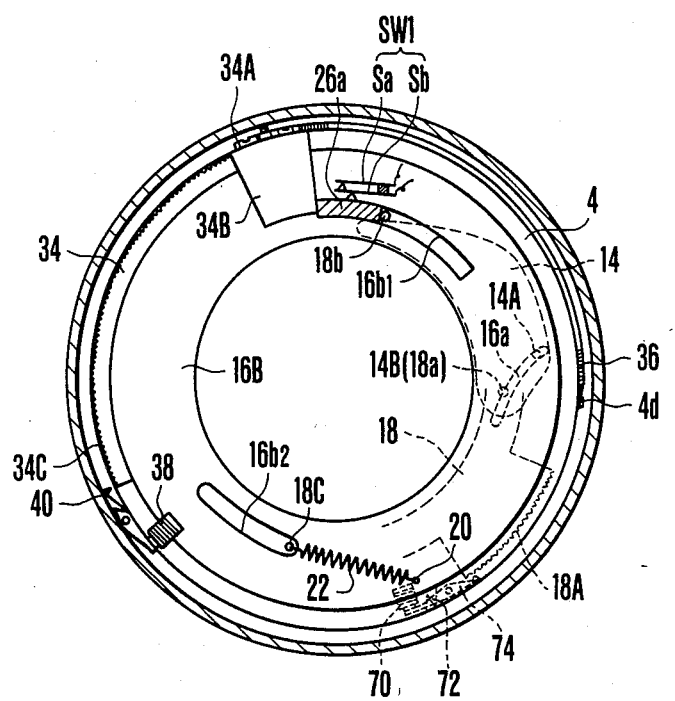
FIG. 2 is a cross-section taken along line A—A of FIG. 1.

The present invention is described in conjunction with an embodiment thereof by reference to the drawings. Referring to FIGS. 1 and 2, focusing lens member L5 and L6 are axially movable as a unit between a front group of lens members L1 to L4 and a rear group of a lens member L7, which are stationary during focusing. Front lens holders 6 and 8 contain the members L1 to L4 and a rear lens holder 2 contains the member L7, which are fixedly secured to a body tube 4 in which the rear end has an adapter 4A for attachment of a lens mounting L to a camera body C. Another lens holder 1, containing the focusing members L5 and L6, is movably fitted in the inner diameter of the body tube 4 and has a radial pin member 10 planted on the outer periphery thereof and extending through an axially elongated slot 4B provided through the wall of the body tube 4 into a camming groove 12A of a cam sleeve 12. The cam sleeve 12 is restrained from axial movement with its front and rear ends 12B1 and 12B2 abutting respectively against the shoulders of the stepped portions of the lens holder 8 and the body tube 4.

Symbol D identifies a diaphragm device comprising a plurality of blades 14, front and rear walls 16A and 16B, and a drive ring 18.

The front wall 16A is fixedly secured to the body tube 4, and a space between the walls 16A and 16B accommodates the diaphragm blades 14 and the drive ring 18.

Each of the diaphragm blades 14 has pins 14A and 14B on either surface thereof, the pin 14A engages a camming slot 16a formed in the front wall 16A, and the other pin 14B engages a fitted hole 18a of the drive ring 18.

A drive connection pin 18b axially extending rearwardly of the drive ring 18, passes through a concentric arcuate slot 16b1 to the optical axis formed in the rear wall 16B and projects outwardly beyond it to be engageable with an output member 26a of a rotor 26 of a motor.

A hooked pin 18c also extends axially rearwardly from the drive ring 18 through an arcuate slot 16b2 of the rear wall 16B, and bears one end of a return coil spring 22, the other end of which is hooked to a pin 20 on the rear wall 16B. The coil spring 22 urges the drive ring 18 in a counterclockwise direction to open the diaphragm blades 14.

Reference symbol M identifies a motor unit. This motor unit M has a stator which is constructed with a first ring-shaped coil 24C of axial elongation between two pole plates 24A and 24B and a second coil 24F between two pole plates 24D and 24E.

A ring-like assembly of a great number of permanent magnet pieces is positioned inside the pole plates 24A-24B and 24D-24E and is rotatably borne on a stationary member 32 through balls 28 in a circumferential groove in the rear end of the outer periphery thereof and is retained in that position by a ring member 30. The permanent magnet pieces constitute the rotor 26. The inner diameter of the rotor 26 is sufficiently large to pass the light beam from the focusing lens members L5 and L6 therethrough. A drive connection member 34 of an "L"-shaped cross-section is fixedly secured at one end to the cam sleeve 12 by a screw fastener 34A, the opposite end of which axially extends rearwardly through a circumferential opening 4C of the body tube 4 and is then bent downward into the path of movement of the output member 26a of the rotor 26. A return spring 36 is tensioned between the "L"-shaped member 34 and a hook pin 4d on the outer surface of the body tube 4 to urge the cam sleeve 12 for the focusing lenses L5 and L6 to one terminal end of movement thereof for minimum or infinite object distance.

A first arresting means, in the form of an electrically operated magnetic device, is provided between the body tube 4 and an outer barrel to automatically set the aforesaid focusing lens L5, L6 to an in-focus position, comprising an electromagnet 38 with a permanent magnet, an armature, and a spring-biased pawl lever 40 cooperating with a toothed portion 34c formed in the outer periphery of the second drive connection 34.

As the rotor 26 rotates in the opposite direction, the diaphragm D moves. When the size of the diaphragm D aperture opening is adjusted to a presetting, the drive ring 18 for the diaphragm blades 14 is arrested by a second arresting means which comprises an armature 70, a spring 72 and a pawl lever 74 cooperating with a toothed portion 18A in the outer periphery of the drive ring 18.

A switch SW1 comprised of a movable contact Sa and a fixed contact Sb, is fixedly mounted on the body tube 4, and is closed by the output member 26a of the rotor 26 when the drive ring 18 starts to rotate.

Figure 3:
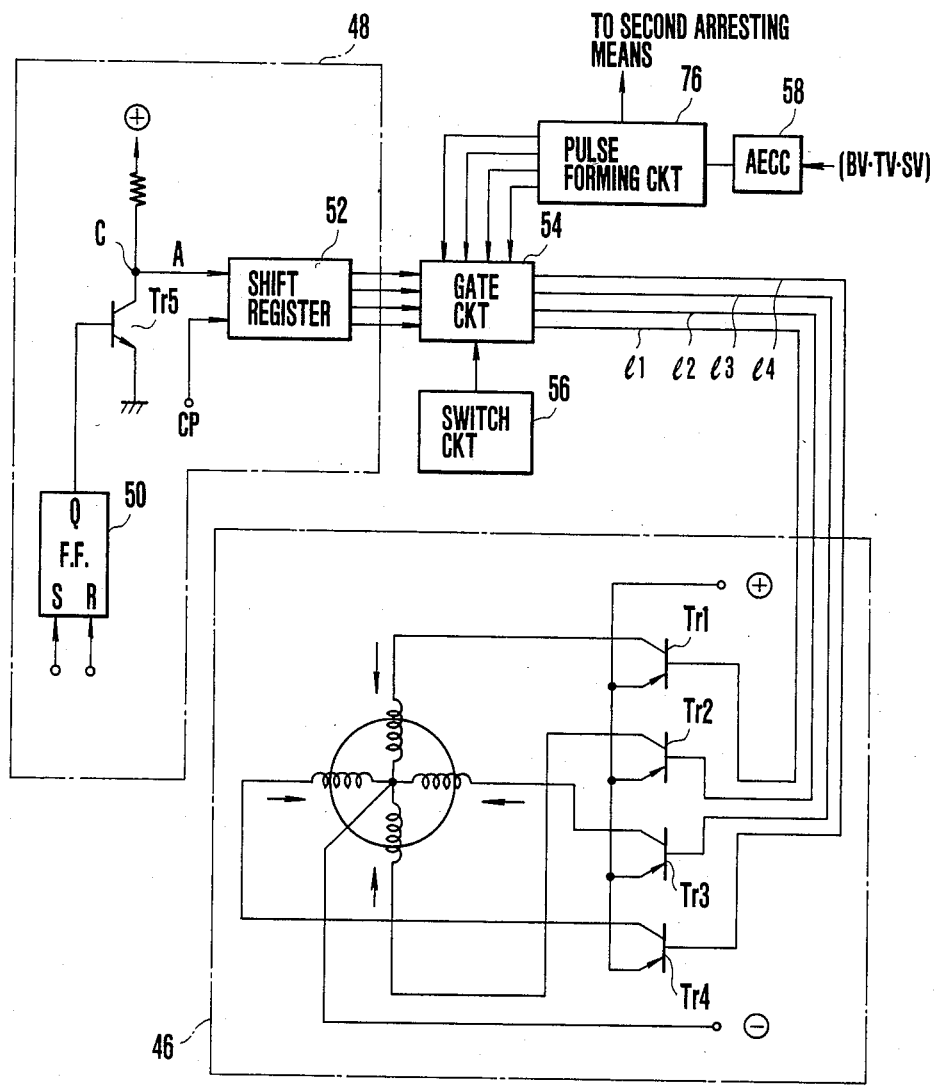
FIG. 3 is an electrical circuit diagram of the motor in the unit.
Figure 4:
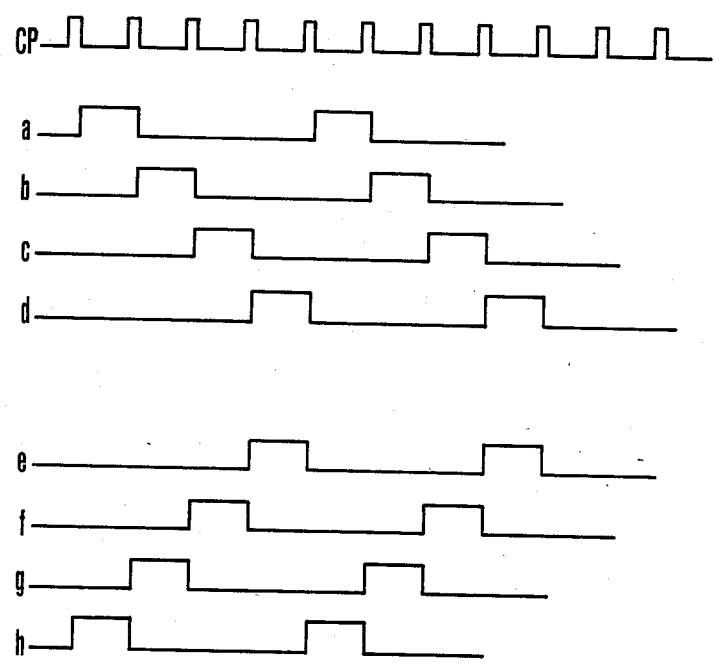
FIG. 4 is a pulse timing chart illustrating two modes of operation of the motor.

FIG. 3 illustrates an electrical circuit for controlling the operations of the various parts of the lens mounting shown in FIGS. 1 and 2. FIG. 4 illustrates the wave forms of the outputs of either a focusing control circuit 48 or an exposure control circuit 58 onto input lines of a drive circuit 46 for the step motor M.

The focusing control circuit 48 comprises a set-reset flip-flop (SR-F.F.) 50, a transistor Tr5 with its base electrode connected to the output of the SR-F.F. and a shift register 52.

The shift register 52 is receptive of clock pulses CP and responsive to an output signal A of the transistor Tr5 when it is of a high level for producing pulses "a", "b", "c" and "d" successively, as shown in FIG. 4, which are placed onto the respective input lines 11 to 14 of the drive circuit 46 by a gate circuit 54. Responsive to the sequence of the pulses "a" to "d", transistors Tr1 to Tr4 successively turn on for a prescribed time supplying electrical power to the coils 24C and 24F. Thereby the rotor 26 is rotated in one direction. When the signal A is of low level, the gate circuit 54 produces other pulses "e" to "h", as shown in FIG. 4, by which the rotor 26 rotates in the reversed direction.

The gate circuit 54 selectively produces the signals "a" to "h" of FIG. 4 based on the signal of a switch circuit 56. The switch circuit 56, responsive to a release-actuating signal, of the camera and an in-focus signal produces an actuating signal for the gate circuit 54. The automatic exposure control circuit 58 computes a proper aperture value based on the preset shutter speed value, the sensitivity of the used film, and object brightness. The output of the circuit 58 is applied to a pulse forming circuit 76 for producing a number of pulses necessary for the rotor 26 to close down the diaphragm D from the full open aperture position to the proper aperture setting.

The operation of the lens mounting L of such a contruction is as follows: With the lens mounting L attached to the camera body C, when a battery switch (not shown) on the camera housing is thrown, the electromagnet 38 allows the associated spring to move the pawl 40 away from the toothed portion 34c of the drive connection member 34. Therefore, the cam sleeve 12 is set by the return spring 36 in the clockwise limit position, as viewed in FIG. 2, where the focusing lenses L5 and L6 take their initial position. The diaphragm device D is also initially set by the spring 22 in the maximum possible aperture position, since the pawl 74 of the second arresting means is out of engagement with any of the teeth 18A of the drive ring 18 by the action of the bias spring 72 when the camera is in the start position.

When a release button on the camera housing is pushed down, the switch circuit 56 of FIG. 3 forces the gate circuit 54 to select the output of the shift register 52 to be placed onto the lines 11 to 14.

Such actuation of the release button also causes the SR-F.F. 50 to be reset which, in turn, causes the transistor Tr5 to become non-conducting. Because the signal A becomes high level, the shift register 52 is responsive to clock pulses CP, and therefore, produces output pulses "a" to "d", as shown in FIG. 4, which pass through the gate circuit 54 and the signal lines 11 to 14 to the motor drive circuit 46. Because the transistors Tr1 to Tr4 are successively turned on by the pulses on the respective signal lines 11 to 14, to energize the coils 24C, 24F of the motor M, the rotor 26 starts to rotate in one direction. Rotation of the rotor 26 is transmitted throught the output member 26a and the drive connection member 34 to rotate the cam sleeve 12 about the optical axis and is further transmitted by axial movement of the focusing lens holder 1.

Since the focusing lenses L5 and L6 are moving, while changing the degree of sharpness of an object image formed on a range finder 64 with light entering through the objectives L1 to L7, a half-mirrored portion of a reflex mirror 60, and reflected from an auxiliary mirror 62, when an in-focus condition is established, a detector 66 produces a control signal. Responsive to this signal, the electromagnet 38 repels its armature so that the pawl 40 engages one of the teeth 34c, and the focusing lens L5, L6 is stopped from further movement.

After the focusing lenses L5 and L6 have been set in sharp focus, either the aforesaid control signal, or the actuating signal for the electromagnet 38 serves as a setting signal for the aforesaid SR-F.F. 50 so that the transistor Tr5 conducts with a drop of the potential at a junction C. Therefore, the signal A changes the low level, causing the shift register 52 to produce the output pulses "e" to "h" of FIG. 4. Since the switching circuit 56 responsive to either the control signal or the actuating signal has set the gating circuit 54 to gate on, the pulses "e" to "h" are then applied through the gate circuit 54 and signal lines 11 to 14 to the transistors Tr1-Tr4 of the motor drive circuit 46 successively but in an opposite order to that when in the focusing mode, whereby the rotor 26 is rotates in the reverse direction.

As the rotor 36 rotates in the reverse direction, when the output member 26a of the rotor 26 reaches the initial position of FIG. 2, the switch SW1 is closed actuating the switching circuit 56, thereby the input of the gate circuit 54 is changed over from the shift register 52 to the pulse forming circuit 76.

The object brightness is measures at the full open aperture of the diaphragm D and then computed with the film speed and shutter speed to obtain an exposure value, i.e., aperture value by the automatic exposure control circuit 58. The computed aperture value is converted to a number of pulses proportional to the difference between the maximum aperture opening and the computed aperture value. These pulses from the pulse forming circuit 76 are placed onto the output lines 11 to 14 by the gate circuit 54 so that the rotor 26 rotates in the reverse or clockwise direction, as viewed in FIG. 2 in a number of steps equal to the number of pulses. Rotation of the rotor 26 is transmitted through the output member 26b and the drive connection member 18d to rotation of the drive ring 18 and therefrom to close down the diaphragm blades 14. When the last pulse exits from the gate circuit 54, the second arresting means is actuated, thereby pawl 74 is brought into engagement with one of the teeth 18A of the drive ring 18. Thus, the diaphragm blades 14 are stopped from further movement with the result that the size of opening of the diaphragm aperture is adjusted to the aforesaid computed aperture value.

As will be understood from the above, the focusing lenses L5 and L6 are held stationary in focus against the bias force of the return spring 36 by the first arresting pawl 40 engaging one of the teeth 34c, and the diaphragm blades 14 are held in the aforesaid adjusted position against the bias force of the spring 22 by the second arresting pawl 74 engaging one of the teeth 18A. In this state, a shutter in the camera is then released. When the exposure is terminated, as the trailing curtain of the shutter runs down, the current supply to the first electromagnet 38 is cut off, thereby the arresting pawl 40 is taken out of engagement with the drive connection member 34. Therefore, the focusing lenses L5 and L6 are returned by the spring 36 to the initial position. Responsive to the signal representing the termination of the exposure, the current supply to the second electromagnet 70 is also cut off, thereby the drive ring 18 is returned by the spring 22 to the initial position where the diaphragm D is fully opened. The lens mounting L is now readied for making the next shot.

As has been described above, according to the present invention, only one motor M suffices for controlling the operation of the focusing lens and the diaphragm device. Further, the stator and rotor of the motor are formed to an annular shape. The rotor is made rotatable in either of the forward and reverse directions. When it rotates in one direction, the focusing lens is driven to move to the in-focus position. By the in-focus signal, the rotor is turned backward to the initial position. Then, the rotor starts to rotate in the reverse direction, while driving the diaphragm device to move to the proper aperture value setting. These features provide an advantage of achieving simplification of the structure of construction of the mechanical mounting for a photographic objective, and minimization of the bulk and size and weight thereof.

It is to be noted that in case when the motor M is in the form of a stepping motor, after the setting operation of the diaphragm has been terminated, the energization of the stator coil may be prolonged until the exposure operation of the camera is terminated, thereby giving an advantage of removing the aforesaid second arresting means, because the rotor is maintained in the advanced position.

Another example of variation is that instead of the exposure control circuit 58, a circuit for presetting a desired value of aperture may be connected to the pulse forming circuit 76.

What is claimed is:
1. A lens mounting cooperative with a focusing control circuit, comprising:
   (a) a lens holder containing a focusing lens;
   (b) a control sleeve rotatable about an optical axis for controlling the axial movement of said lens holder;
   (c) a diaphragm device including diaphragm blades, a drive ring for driving said diaphragm blades, and means for urging said diaphragm blades in a direction to a prescribed aperture value;
   (d) a motor arranged upon rotation about the optical axis in one direction to perform a focusing function, and upon rotation in the reverse direction to control said diaphragm device, a stator of said motor being fixed at the inside of said lens mount while a rotor thereof being formed in a ring-shaped magnet through which the reflected light from an object passes;
(e) first transmitting means for connecting said control sleeve and said rotor of the motor and being rotated about the optical axis by the rotation of said rotor thus rotating said control sleeve;
(f) first arresting means responsive to a signal from said focusing control circuit for arresting and holding said focusing lens in the in-focuc position;
(g) second transmitting means for transmitting rotating power of said motor to said drive ring; and
(h) second arresting means for arresting and holding said diaphragm blades in a size of aperture opening against said urging means.

2. A lens drive system comprising:
(A) a lens mounting including:
  (a) a focusing lens;
  (b) focusing means having a control sleeve for moving said focusing lens;
  (c) a diaphragm device including diaphragm blades and a drive ring for controlling said diaphragm blades; and
  (d) a motor arranged upon rotation about an optical axis in one direction to drive motion of said focusing means and upon rotation in the reverse direction to drive said diaphragm device, a stator of said motor being fixed at the inside of said lens mount while a rotor thereof being formed in a ring-shaped magnet through which the reflected light from an object passes;
(B) a focusing circuit for producing a signal for controlling said motor to rotate in said one direction to effect focusing;
(C) a pulse forming circuit for producing a signal to control the rotation of said motor in the reverse direction based on either preset aperture information or computed aperture information;
(D) a motor drive circuit for driving said motor in the forward or reverse direction depending on the output signals of said pulse forming circuit and said focusing circuit; and
(E) gate means for changing over the input to said motor drive circuit between the output signals of said pulse forming circuit and said focusing circuit.

3. A lens drive system according to claim 2, further comprising:
a focusing control circuit for producing an in-focus signal when said focusing lens comes to the in-focus position,
whereby said focusing circuit is stopped by the in-focus signal from said focusing control circuit.

4. A lens drive system according to claim 3, further comprising:
first arresting means for arresting and holding said focusing lens in the in-focus position, said first arresting means being actuated by the in-focus signal of said focusing control circuit; and
second arresting means for arresting and holding said diaphragm device in a size of aperture opening corresponding to said preset aperture information or computed aperture information.

5. A lens drive system comprising:
(A) a lens mounting including:
  (a) a focusing lens;
  (b) focusing means having a control sleeve for moving said focusing lens;
  (c) a diaphragm device including diaphragm blades and a drive ring for controlling said diaphragm blades; and
  (d) a motor arranged upon rotation about an optical axis in one direction to drive motion of said focusing means and upon rotation in the reverse direction to drive said diaphragm device;
(B) a focusing circuit for producing a signal for controlling said motor to rotate in said one direction to effect focusing;
(C) a pulse forming circuit for producing a signal to control the rotation of said motor in the reverse direction based on either preset aperture information or computed aperture information;
(D) a motor drive circuit for driving said motor in the forward or reverse direction depending on the output signals of said pulse forming circuit and said focusing circuit;
(E) switching means being opened and closed by the rotation of said motor, said switching means being activated at a time when said diaphragm device is driven by said motor from a fully opened aperture position to a stopped down aperture position; and
(F) gate means for detecting an operating signal of said switching means and changing over the input of said pulse forming circuit and said motor drive circuit.

* * * * *